United States Patent
Han

(10) Patent No.: US 9,123,484 B2
(45) Date of Patent: Sep. 1, 2015

(54) HALF-AUTOMATIC SWITCH

(75) Inventor: Hee Kwan Han, Goyang-si (KR)

(73) Assignee: ENSM CO., LTD., Goyang-Si (KR)

( * ) Notice: Subject to any disclaimer, the term of this patent is extended or adjusted under 35 U.S.C. 154(b) by 1059 days.

(21) Appl. No.: 13/126,954

(22) PCT Filed: Nov. 25, 2009

(86) PCT No.: PCT/KR2009/006991
§ 371 (c)(1), (2), (4) Date: Apr. 29, 2011

(87) PCT Pub. No.: WO2010/062111
PCT Pub. Date: Jun. 3, 2010

(65) Prior Publication Data
US 2011/0210622 A1    Sep. 1, 2011

(30) Foreign Application Priority Data
Nov. 25, 2008 (KR) .................. 10-2008-0117718

(51) Int. Cl.
*H01H 35/00* (2006.01)
*H01H 13/56* (2006.01)
*H05B 37/02* (2006.01)

(52) U.S. Cl.
CPC ......... *H01H 13/568* (2013.01); *H05B 37/0227* (2013.01); *Y10T 307/766* (2015.04)

(58) Field of Classification Search
USPC ............................................ 307/116
See application file for complete search history.

(56) References Cited

U.S. PATENT DOCUMENTS 6,466,826 B1 * 10/2002 Nishihira et al. ............. 700/17
2007/0290630 A1 * 12/2007 Kim ........................ 315/308

* cited by examiner

*Primary Examiner* — Jared Fureman
*Assistant Examiner* — Duc M Pham
(74) *Attorney, Agent, or Firm* — Justin H. Kim; Maxon IP LLC.

(57) ABSTRACT

A half-automatic switch is operated in concert with a movement detecting sensor, and is also manually driven to supply power to an electric apparatus. The driving of the half-automatic switch is stopped when it is manually turned off or a signal from the movement detecting sensor is not provided. When the driving of the half-automatic switch is stopped, it is again manually driven irrespective of whether the signal from the movement detecting sensor is provided.

14 Claims, 10 Drawing Sheets

HALF-AUTOMATIC SWITCH

TECHNICAL FIELD

The present invention relates to a half-automatic switch.

BACKGROUND ART

Research on saving electrical energy has been conducted according to an energy saving policy. Particularly, for electrical products, a technology for cutting power supply to products when a user does not use it for a long time has been developed.

In addition, irrespective of a user's control, when a specific condition is satisfied such as there is no person for a predetermined time at a specific position, an automatic on/off switch for cutting the power supply to an electrical apparatus has been developed.

A sensor for detecting a person such as a passive pyroelectric infrared (PIR) sensor and an active microwave sensor may be used in the above case. The switch connected to a load is automatically closed when the sensor detects a person, and thereby power is supplied to the load. However, when a person is not detected by the sensor, the switch automatically opens, and thereby the power supplied to the load is cut.

The automatic on/off switch based on these technologies has advantages of electrical energy savings as well as eliminating the inconvenience of having to manually turn a switch on/off.

For theses reasons, fields to which the automatic on/off switch is applied gradually have increased. For example, the automatic on/off switch is may be used in a field of lighting industry, a field of alarm industry, a field in which electrical energy savings is required due to power consumption, a field of electric home appliances, and others.

Although there are many advantages in using the automatic on/off switch, in fact, there are few fields using it because of problems such as malfunctions of the sensor. More specifically, an active microwave sensor as the sensor for detecting has narrow coverage and further detects all objects that move in the coverage area, thereby causing an unnecessary on/off operation.

Also, since the passive PIR sensor reacts to infrared light from all living things, there are problems such as unnecessary on/off operation of the switch due to a dog or cat, light input from the outside, or heat change.

Further, although a person passes by around where the sensor for detecting is operated, without intent to operate an electric product, the switch is automatically turned on, thereby operating the electric product. Therefore, it is impossible to control the on/off operation of the switch within the coverage area of the sensor.

Additional apparatuses for solving the problems have been developed, but they raise the unit cost in producing the switch. Further, since the problems have not yet been completely solved, the additional apparatuses are not substantially used.

Accordingly, in fact, there are no fields in which the automatic on/off switch is used other than fields using lighting that is installed at an entrance and stairs, an alarm, an automatic door, and others.

As a related art to the automatic on/off switch, there is a saving switch that is disclosed in Korean Patent Issue No. 10-454532. In the saving switch, a corresponding light is manually turned on by a user such as by pressing an auto switch button or a manual switch button. At the same time, a sensor becomes turned off for a predetermined time, so the sensor cannot detect a user when the user enters within the coverage of the sensor. Meanwhile, when the sensor detects a user going out, the light is automatically turned off, or a predetermined sound is output to make the user turn off the light.

However, the switch does not operate when many people are within the coverage area. Also, in this case, although one person goes out of the coverage area, if another person remains there, the switch is turned off. In addition, when the lighting is on, it is automatically turned off only by operating the auto switch button while the lighting is manually turned off by a user if operating the manual switch button.

Accordingly, when a user goes out the coverage area after operating the manual switch button because of mistaking the manual switch button for the auto switch button, the lighting maintains the state of being turned on, thereby increasing the power consumption of the lighting.

As another related art to the automatic on/off switch, there a saving switch having an automatic mode function and a control method thereof which is disclosed in Korean Patent Publication No. 2005-0103121. The related art provides a saving switch that automatically causes lighting to be turned on when a sensor detects a moving object or opening of a door. After this, the saving switch automatically causes the light to be turned off when the sensor again detects a moving object or opening of a door.

The saving switch of No. 2005-0103121 has additional auto on/off functions in comparison with the saving switch of No. 10-454532. Thus, the saving switch of No. 2005-0103121 still has problems related to the saving switch of No. 10-454532 as well as problems that the light becomes unnecessary iteratively turned on/off by malfunction of the sensor.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a half-automatic switch having advantages of reducing malfunctions and being easily used.

Also, the present invention has been made in an effort to provide a half-automatic switch having advantages of efficiently saving power.

Solution to Problem

An exemplary embodiment of the present invention provides a half-automatic switch that is connected to a movement detecting sensor and supplies power to a load unit using electrical energy. The half-automatic switch includes:

an input switch;

a switch unit for supplying power to the load unit; and a controller that drives the switch unit to supply the power to the load unit when the input switch is operated and stops the driving of the switch unit to cut the power supplied to the load unit when a signal from the movement detecting sensor is not provided in a state in which the switch unit is driven, wherein the controller drives the switch unit according to whether the input switch is operated, irrespective of whether the signal from the movement detecting sensor is provided, when the switch unit is not driven.

Another embodiment of the present invention provides a half-automatic switch that is connected to a movement detecting sensor and supplies power to a load unit using electrical energy. The half-automatic switch includes:

a switch unit for supplying power the load unit when being driven; and a controller that stops the driving of the switch unit to cut the power supplied to the load unit when a detection signal from the movement detecting sensor is provided in a state in which the switch unit is driven, wherein the controller maintains stopping the driving of the switch unit, irrespective of the detection signal from the movement detecting sensor when the switch unit is not driven.

Herein, the switch unit may be manually driven and then may not be manually driven or by the control of the controller.

Advantageous Effects of Invention

According to the exemplary embodiments of the present invention, when using a device that is driven by power applied by a switch, it is possible to easy use the device and to provide electricity savings.

Particularly, it is possible to prevent malfunction by the movement detecting sensor because the switch is only manually turned on, irrespective of a signal from the sensor after the switch is turned off.

Also, it is possible to efficiently save power while solving inconvenience in using the switch because the switch is automatically turned off when a condition is satisfied, irrespective of a control of a user.

In addition, the off state of the switch is maintained until the switch is manually turned on after being automatically turned off.

In the prior art, all electric appliances that are installed in an area may be turned on or off against a user's will when the user stands near a movement detecting sensor in the area. However, according to the exemplary embodiments of the present invention, the user, in this case, may selectively operate at least one among the electric appliances according to user's need.

Also, it is possible to prevent standby power for monitoring a user to automatically cause the switch to be turned on from being consumed.

MODE FOR THE INVENTION

Figure 1:
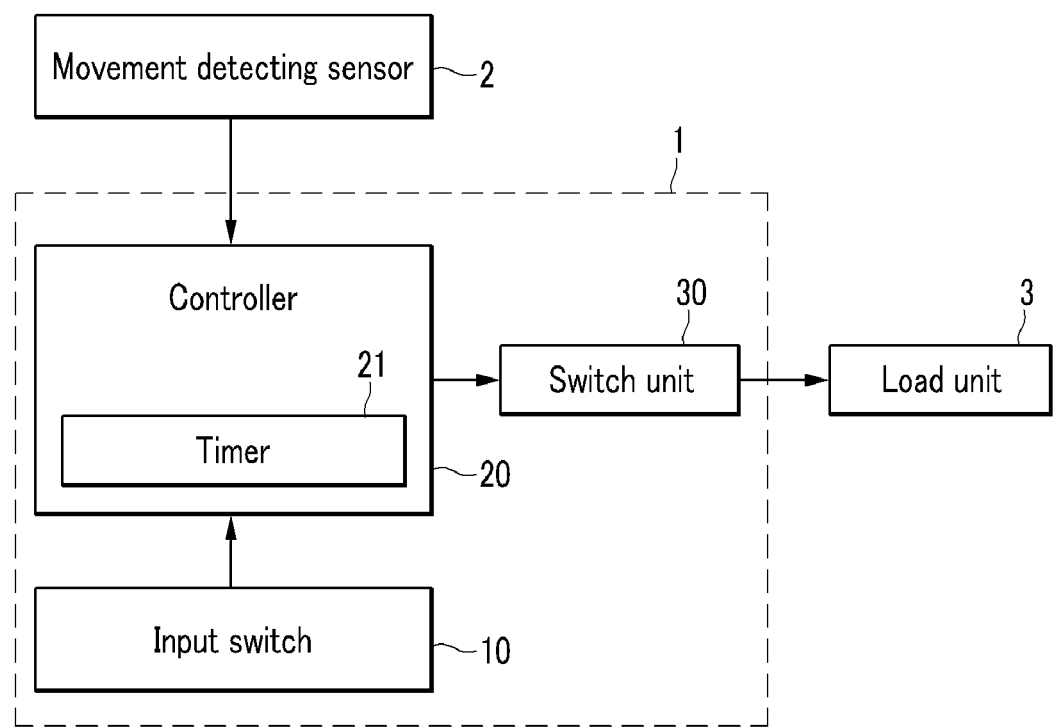
FIG. 1 shows a configuration diagram of a half-automatic switch according to a first exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

Now, a half-automatic switch according to an exemplary embodiment of the present invention will be described.

In the half-automatic switch according to an exemplary embodiment of the present invention, driving the half-automatic switch is manually performed and stopping the driving of the half-automatic switch is automatically or manually performed.

More specifically, the half-automatic switch according to an exemplary embodiment of the present invention functions as a power supply means for electrical energy to an electric appliance, in connection with a movement detecting sensor. Herein, the electric appliance represents all types of apparatuses that are driven by electricity.

Sensors that are located at a position to detect whether a target object is present or whether the object is moving such as a passive pyroelectric infrared (PIR) sensor and an active microwave sensor may be used as the movement detecting sensor.

In the case in which the movement detecting sensor operates as above, the half-automatic switch is manually driven by a user. Then, the driving of the half-automatic switch is automatically stopped in interaction with the movement detecting sensor after the half-automatic switch is driven.

Further, the driving of the half-automatic switch may be manually stopped irrespective of the movement detecting sensor after the half-automatic switch is driven.

As described above, since the half-automatic switch is manually driven, a signal provided from the movement detecting sensor is disregarded when the driving of the half-automatic switch stops, thereby it is possible to prevent a malfunction of the half-automatic switch from a malfunction of the movement detecting sensor.

Herein, driving of a switch represents that power is supplied to an electric appliance by the half-automatic switch according to an exemplary embodiment of the present invention. Also, stopping the driving of a switch represents that power supplied to the electric appliance is cut by the half-automatic switch.

Hereinafter, for better comprehension and ease of description, the driving of a switch is referred as being switched on and the stopping the driving of the switch is referred as being switched off.

A half-automatic switch according to a first exemplary embodiment of the present invention will now be described.

FIG. 1 shows a configuration diagram of the half-automatic switch according to the first exemplary embodiment of the present invention.

As shown in FIG. 1, a half-automatic switch 1 according to the first exemplary embodiment of the present invention includes an input switch 10, a controller 20, and a switch unit 30. Particularly, the half-automatic switch 1 is connected to a movement detecting sensor 2 and is further connected to an apparatus using electrical energy, that is, a load unit 3.

The input switch 10 is operated in concert with an operation button that is manually operated. For example, when a user presses the operation button, the input switch 10 is turned on. After this, when the user again presses the button or the state in which the button is pressed is changed, the input switch 10 is turned off.

The switch unit 30 is operated according to a signal provided from the controller 20, supplies power to the load unit 3 when being turned on, and cuts power supplied to the load unit 3 when being turned off. The switch unit 30 may be embodied in a form including a driving module that is operated by a signal from the controller 20, and a switch module of which the on/off status is changed by the driving module.

The controller 20 controls the driving of the switch unit 30 based on a signal provided from the input switch 10 and/or the movement detecting sensor 2. More specifically, when the switch unit 30 is turned on, the controller causes the switch unit 30 to be turned off according to a signal provided from the movement detecting sensor 2.

For this purpose, the controller 20 causes the switch unit 30 to be turned on when the input switch 10 is turned on, and then causes the switch unit 30 to be turned off according to a signal provided from the movement detecting sensor 2 even though the input switch 10 is not turned off in a case in which the switch unit 30 is turned on. At this time, the controller 20 may include a timer 21 to more efficiently control the switch unit 30.

Meanwhile, the controller 20 may also cause the switch unit 30 to be turned off if the input switch 10 is turned off when the switch unit 30 is on.

The switch unit 30 is turned on/off according to the control of the controller 20, that is, the signal provided from the controller 20 in the half-automatic switch according to the first exemplary embodiment of the present invention, and therefore, the half-automatic switch may be called "a half-automatic switch of an indirect operating method".

Next, the operation of the half-automatic switch according to the first exemplary embodiment of the present invention will be described.

Figure 2:
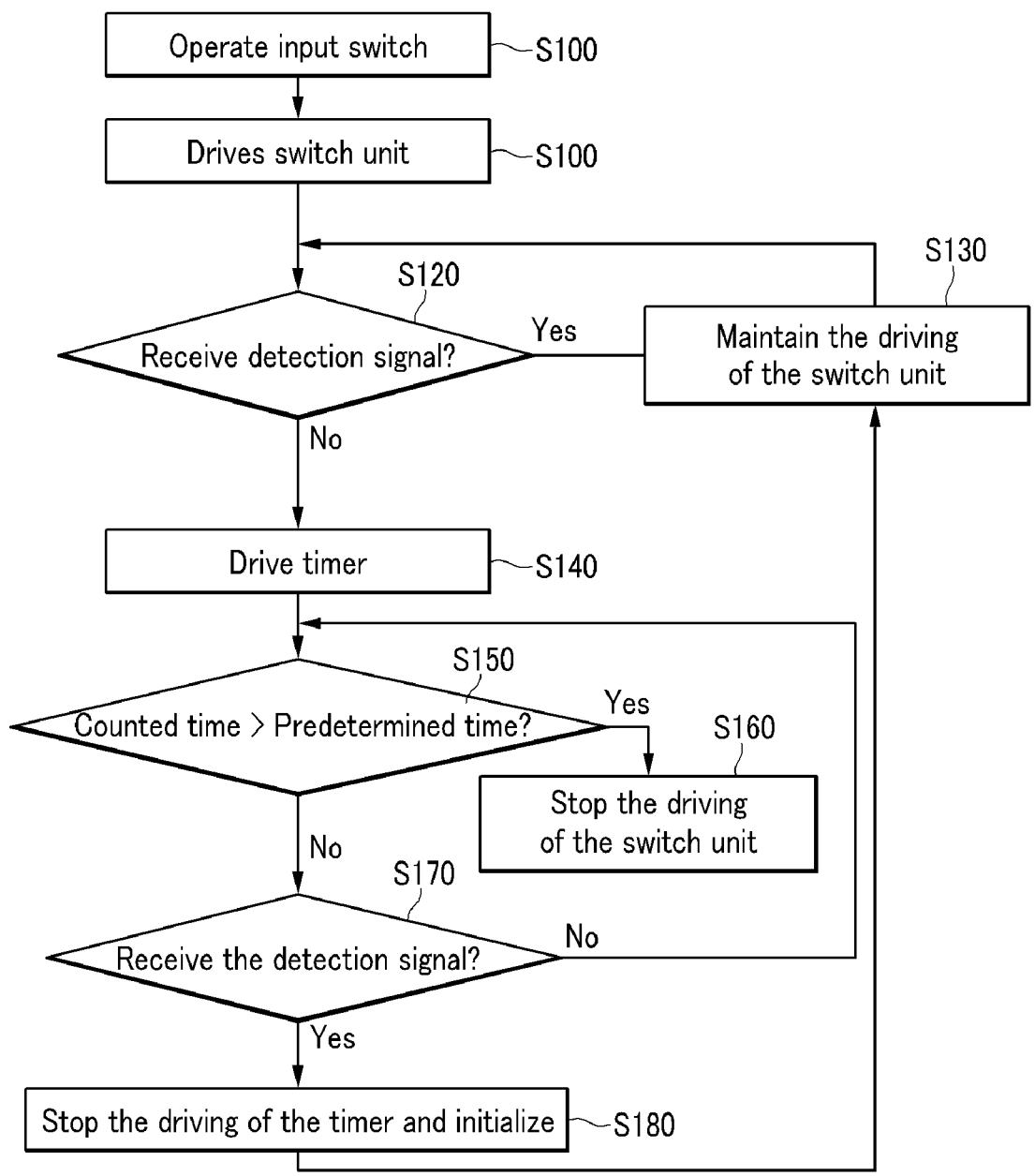
FIG. 2 shows a flowchart of the half-automatic switch of the first exemplary embodiment of the present invention.

FIG. 2 shows an operation flowchart of the half-automatic switch according to the first exemplary embodiment of the present invention.

It is assumed that the half-automatic switch is off. In this case in which the half-automatic switch is off, when the half-automatic switch is manually turned on, that is, the input switch 10 is turned on by a user, the controller 20 provides a driving signal to the switch unit 30 to cause it to be turned on (S100-S110).

When the switch unit 30 is turned on, power is supplied to the load unit 3 connected to the switch unit 30 and then the load unit 3 is driven. For example, if the load unit 3 is a light located at an area, the light is turned on in concert with the manually turned-on switch unit 30.

The controller 20 is provided with a detection signal generated by whether a target object exists or a target object is moving from the movement detecting sensor 2 when the switch unit 30 is turned on. Herein, it is assumed that the movement detecting sensor 2 sends the detection signal to the controller 20 when there is a target object in an area and does not send it when there is not. The present invention is not restricted thereto.

The controller 20 controls the switch unit 30 to maintain the on-state if the detecting is provided from the moving detecting sensor 2 when the switch unit 30 is on (S120-S130). Accordingly, power is continuously supplied to the load unit 3 by the switch unit 30 when it is determined that the target object is in the area in a case of the on-state of the switch unit 30, thereby maintaining the driving of the load unit 3.

Meanwhile, if the detection signal is not provided from the movement detecting sensor 2 when the switch unit 30 is on, the controller 20 operates the timer 21 (S140).

The controller 20 compares the time counted by the timer 21 with a predetermined time to determine whether the counted time is greater than the predetermined time (S150). Nevertheless, when the time counted from a point of time when the detection signal is not sent from the movement detecting sensor 2 passes the predetermined time, the controller 20 causes the switch unit 30 to be turned off (S160). As a result, power supplied to the load unit 3 by the switch unit 30 is cut, thereby stopping the driving of the load unit 3.

Meanwhile, if the detection signal is sent from the movement detecting sensor 2 when the time counted from a point of time at which the detection signal is not sent from the movement detecting sensor 2 does not pass the predetermined time (S170), the controller 20 initializes the timer 21 and continuously maintains the switch unit 30 to be turned on.

Further, when the input switch is turned off in a case in which the counted time does not pass the predetermined time, the controller 20 causes the switch unit 30 to be turned off to cut the power supplied to the load unit 3, irrespective of the detection signal from the movement detecting sensor 2.

As described above, unless the switch unit 30 is manually turned on after the switch unit 30 is turned off by the controller 20, that is, unless the input switch is manually turned on, the off-state of the switch unit 30 is maintained to cut the power supplied to the load unit 3.

Therefore, no matter when the detection signal generated by a malfunction of the movement detecting sensor 2 is sent to the controller 20, the controller 20 ignores the detection signal and maintains the off-state of the switch unit 30. Accordingly, it is possible to prevent unnecessary operation of the load unit 3 due to a malfunction of the movement detecting sensor 2.

In the first exemplary embodiment, when the input switch 10 is turned off in a case in which power is supplied to the load unit 3 after the switch unit 30 is turned on by the input switch 10, the controller 20 directly causes the switch unit 30 to be turned off to cut the power supplied to the load unit 3.

Meanwhile, for reliable control in the first exemplary embodiment, the controller 20 uses a number of iterations in which the counted time passes the predetermined time as a control variable and further compares the number of iterations with a predetermined number, in addition to comparing the counted time with the predetermined time.

More specifically, when the counted time passes the predetermined time in step S150, the controller 20 increases the number of iterations by 1 without directly causing the switch unit 30 to be turned off and then compares the increased number of iterations with the predetermined number. When the increased number of iterations is greater than the predetermined number, the controller 20 may cause the switch unit 30 to be turned off.

When the increased number of iterations is not greater than the predetermined number, the controller 20 initializes the timer 21 and moves to step S120 to determine whether the detection signal is provided from the movement detecting sensor 2. After this, the following steps are performed based on the result of the determination.

As described above, the switch unit 30 is turned off when the condition representing that the time counted from a point of time when the detection signal is not provided passes the predetermined time is iteratively satisfied, and thereby better reliable and stable control is performed.

According to the first exemplary embodiment of the present invention, for example, when the load unit is a light located in an area, the light is turned on if the half-automatic switch is manually turned on, and then the light is turned off because the half-automatic switch is turned off by the controller if a predetermined time has passed after determining that there is no person in the area.

Since the light is not turned on unless the half-automatic switch is manually turned on by a user after the half-automatic switch is off, it is possible to prevent the light from being turned on by a malfunction of the movement detecting sensor such as detecting an animal or determining light from the outside or heat as a target object. This can efficiently save power.

Only if the half-automatic switch is turned on by a user in a case in which the light is off is the light turned on. At this time, since the user has turned on the half-automatic switch by user's need, it may be said that there is no problem or inconvenience for use of the half-automatic switch.

Meanwhile, in order to save standby power in the half-automatic switch according to the first exemplary embodiment, power may be supplied to the controller 20 in concert with the operation of the input switch 10. That is, in order to prevent the standby power need when operating the controller 20 from being consumed when the input switch 10 is not operated, it is possible to supply power the controller 20 when the input switch 10 is operated and to cut the power supplied to the controller 20 when the input switch 10 is again operated or is turned off.

Figure 3:
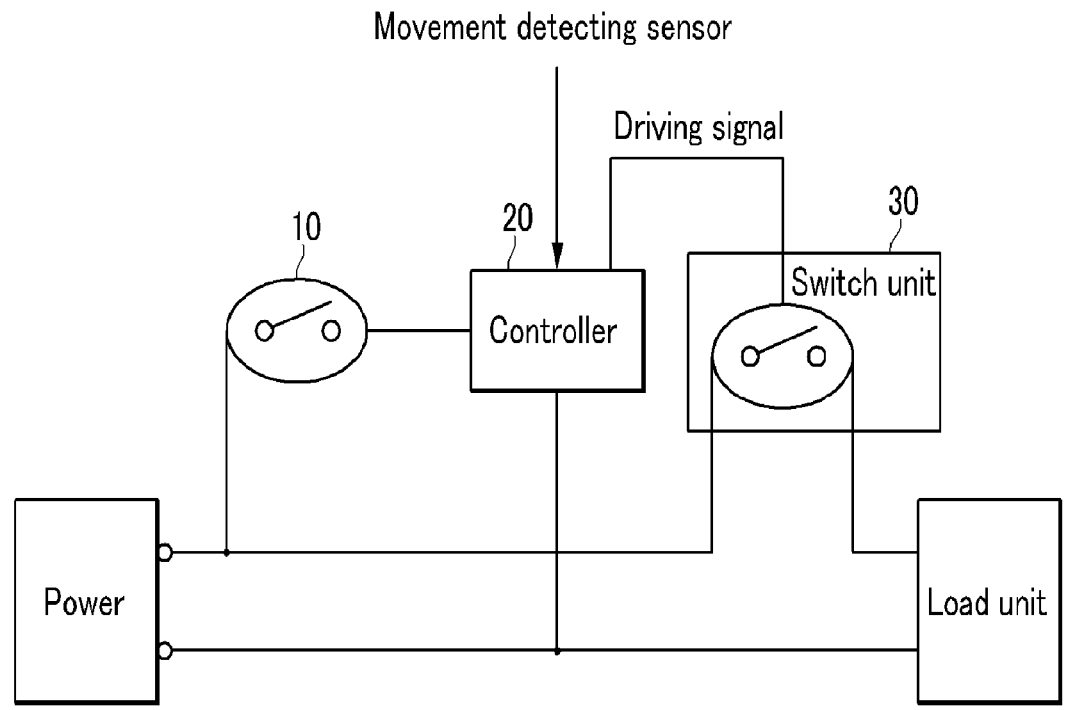
FIG. 3 and FIG. 4 show a connection of constituent elements for preventing standby power consumption in the half-automatic switch according to the first exemplary embodiment of the present invention.

FIG. 3 shows a connection of constituent elements for preventing standby power consumption in the half-automatic switch according to the first exemplary embodiment of the present invention.

As shown in FIG. 3, in the half-automatic switch according to the first exemplary embodiment of the present invention, the switch unit 30 is coupled with a source of electric power in series, and the controller 20 is coupled the switch unit 30 in series.

The load unit 3 is also connected to the half-automatic switch. That is, a terminal of the input switch 10 is connected to the source and another terminal of input switch 10 is connected to the controller 20. A terminal of the controller 20 is connected to the input switch 10 and another terminal of the controller 20 is connected to the source. A terminal of the switch unit 30 is connected to the source and another terminal of the switch unit 30 is connected to the load unit 3 to operate according to a signal from the controller 20.

By these connections between the constituent elements, when the input switch 10 is turned on, power from the source is supplied to the controller 20. The controller 20 determines that the input switch 10 is on when the power is supplied and operates the switch unit 30. That is, the controller 20 outputs a driving signal to operate the switch unit 30 and then a switch of the switch unit 30 is turned on by the operating of the switch unit 30, thereby causing the power from the source to be supplied to the load unit 3.

On the contrary, when the input switch 10 is turned off, the power from the source to the controller 20 is cut, thereby stopping the driving of the controller 20 and then stopping the outputting of the driving signal. As a result, the switch of the switch unit 30 is turned off, which cuts the power supplied to the load unit 3 through the switch unit 30.

As described above, only when the input switch 10 is turned on, the power from the source is supplied to the controller 20, thereby preventing standby power consumption for the operating of the controller 20 and particularly power consumption for checking whether a detection signal is received from the movement detecting sensor 2. Accordingly, it is possible to efficiently save power.

In addition, it is possible to control the power that is supplied to the controller 20 using another power supplying control means to prevent the standby power consumption.

Figure 4:
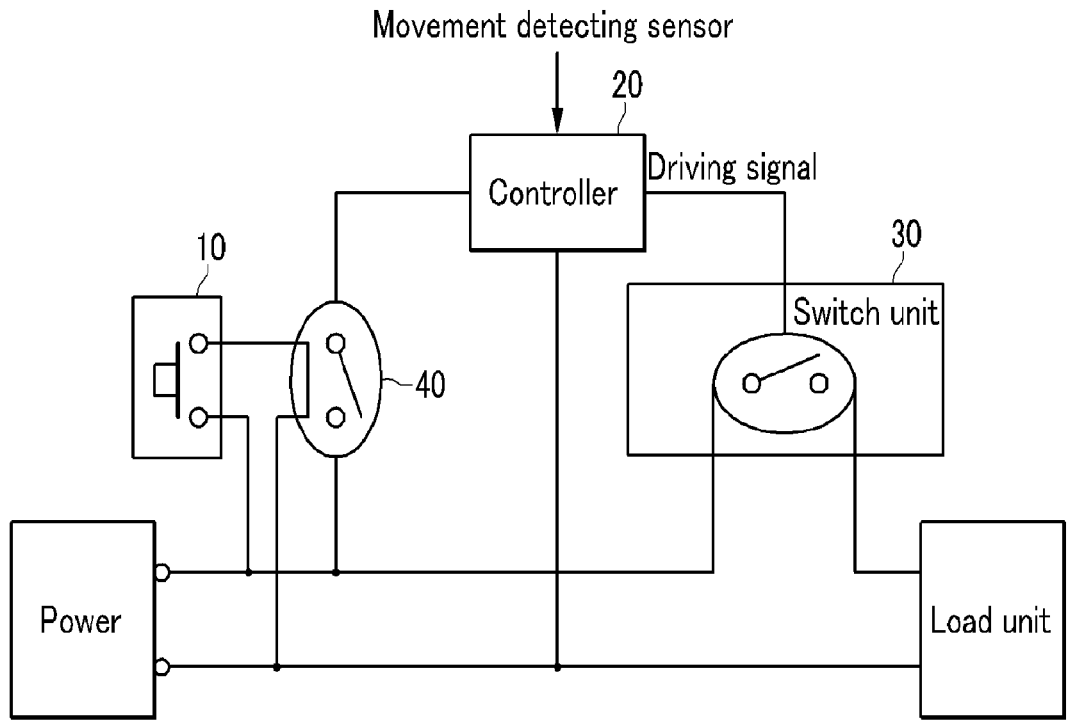

FIG. 4 shows another connection of constituent elements for preventing standby power consumption in the half-automatic switch according to the first exemplary embodiment of the present invention.

In FIG. 4, in the half-automatic according to the first exemplary embodiment of the present invention, a power supplying controller 40 for supplying power to the controller 20 based on the operation state of the input switch 10 is further included.

More specifically, a terminal of the input switch 10 is connected to the source, another terminal of the input switch 10 is connected to the power supplying controller 40, a terminal of the power supplying controller 40 is connected to the controller 20, and another terminal of the power supplying controller 40 is connected to the source.

A terminal of the controller 20 is connected to the power supplying controller 40 and another terminal of the controller 20 is connected to the source. A terminal of the switch unit 30 is connected to the source, another terminal of the switch unit 30 is connected to the load unit 3, and the switch unit 30 is operated according to a driving signal from the controller 20.

Herein, the input switch 10 operates in a method in which its contact is connected and is then directly separated when operating. For example, when a user presses the input switch 10, it is turned on and then is directly turned off. Accordingly, when the input switch 10 is pressed, the power supplying controller 40 operates and power is supplied to the controller 20 through the power supplying controller 40.

The controller 20 is then operated, as described with respect to FIG. 3, which causes the switch unit 30 to be operated and then power is supplied to the load unit 3. If the input switch 10 is again pressed when the power is supplied to the load unit 3, the power supplying controller 40 is turned off and the power supplied to the controller 20 is cut, thereby causing the switch of the switch unit 30 to be turned off and then the power supplied to the load unit 3 is cut.

Meanwhile, if the detection signal from the movement detecting sensor 2 is not provided for a predetermined time when the switch unit 30 is on, the controller 20 causes the switch unit 30 to be turned off to cut the power supplied to the load unit 3 and then causes to power supplying controller 40 to be turned off to cut the power supplied to the controller 20. Accordingly, standby power consumption is prevented.

Next, a half-automatic switch according to a second exemplary embodiment of the present invention will be described.

The half-automatic switch according to the second exemplary embodiment of the present invention includes a switch unit that is driven according to an operation of an input switch, contrary to the first exemplary embodiment. That is, the switch unit is driven according to the operation state of the input switch irrespective of control of a controller. Also, the switch unit may operate according to a driving signal from the controller when being driven.

Figure 5:
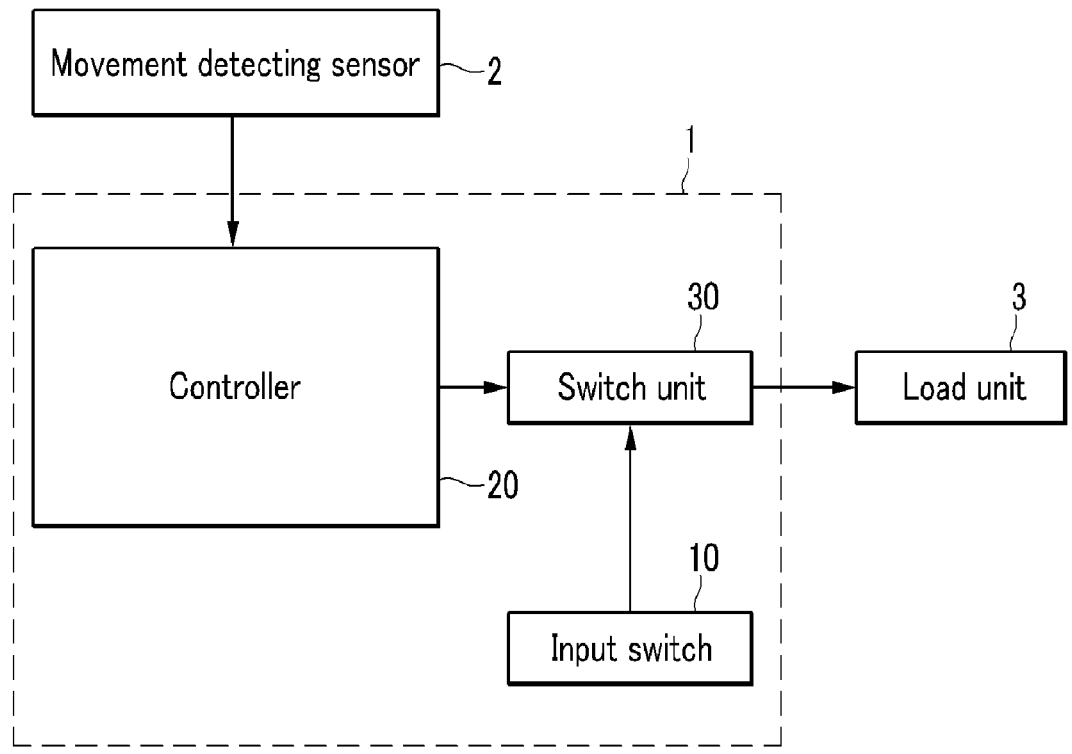
FIG. 5 shows a configuration diagram of a half-automatic switch according to a second exemplary embodiment of the present invention.

FIG. 5 shows a configuration diagram of a half-automatic switch according to the second exemplary embodiment of the present invention.

As shown in FIG. 5, a half-automatic switch 1 according to the second exemplary embodiment of the present invention includes, like the first exemplary embodiment, an input switch 10, a controller 20, and a switch unit 30. The controller 20 includes a timer. The half-automatic switch 1 according to the second exemplary embodiment basically operates the same as the first exemplary embodiment.

In the second exemplary embodiment, like reference numerals designate like elements of the first exemplary embodiment, and descriptions of functions of the same elements as in the first exemplary embodiment will be limited.

Contrary to the first exemplary embodiment, the switch unit 30 of the second exemplary embodiment of the present invention operates in concert with the input switch 10.

More specifically, as shown in FIG. 5, the switch unit 30 operates to supply power to the load unit 3 when the input switch 10 is turned on, and the operating of the switch unit 30 is stopped when the input switch 10 is turned off to cut the power to the load unit 3.

The controller 20 controls the switch unit 30 according to a signal from the movement detecting sensor 2.

The switch unit 30 operates according to the driving signal from the controller 20, but it does not operate even when the driving signal is provided when the half-automatic switch 1 is off. In addition, the switch unit 30 stops operating if the driving signal is not provided when the half-automatic switch 1 is on irrespective of the control of the input switch 10.

In the half-automatic switch according to the second exemplary embodiment of the present invention, the switch unit 30 operates according to the operation of the input switch 10, and thereby the half-automatic switch is called "a half-automatic switch of a direct operation scheme".

The operation of the half-automatic switch according to the second exemplary embodiment of the present invention is the same as that of the first exemplary embodiment, and contrary to the first exemplary embodiment, the switch unit 30 operates to supply power to the load unit 3 irrespective of the controller 20 when the input switch 10 operates.

In a case when power is supplied to the load unit 3, the operating of the switch unit 30 may stopped according to the control of the controller 20 as in the first exemplary embodiment. That is, when a detection signal from the movement detecting sensor 2 is not provided until a predetermined time elapses, the operation of the switch unit 30 is stopped by the controller 20 and power supplied to the load unit 3 is cut.

Also, when the input switch 10 does not operate or re-operates in a case in which the power is supplied to the load unit 3, as in the first exemplary embodiment, the operation of the switch unit 30 is stopped, thereby cutting the power supplied to the load unit 3.

Meanwhile, in order to reduce standby power consumption in the half-automatic switch according to the second exemplary embodiment, power may be supplied to the controller 20 in concert with the operation of the switch unit 30. That is, in order to prevent standby power for driving the controller 20 in a case when the switch unit 30 is not operated, power is supplied to the controller 20 when the switch unit 30 operates by the input switch 10 and the power supplied to the controller 20 is cut when the operation of the switch unit 30 is stopped.

Figure 6:
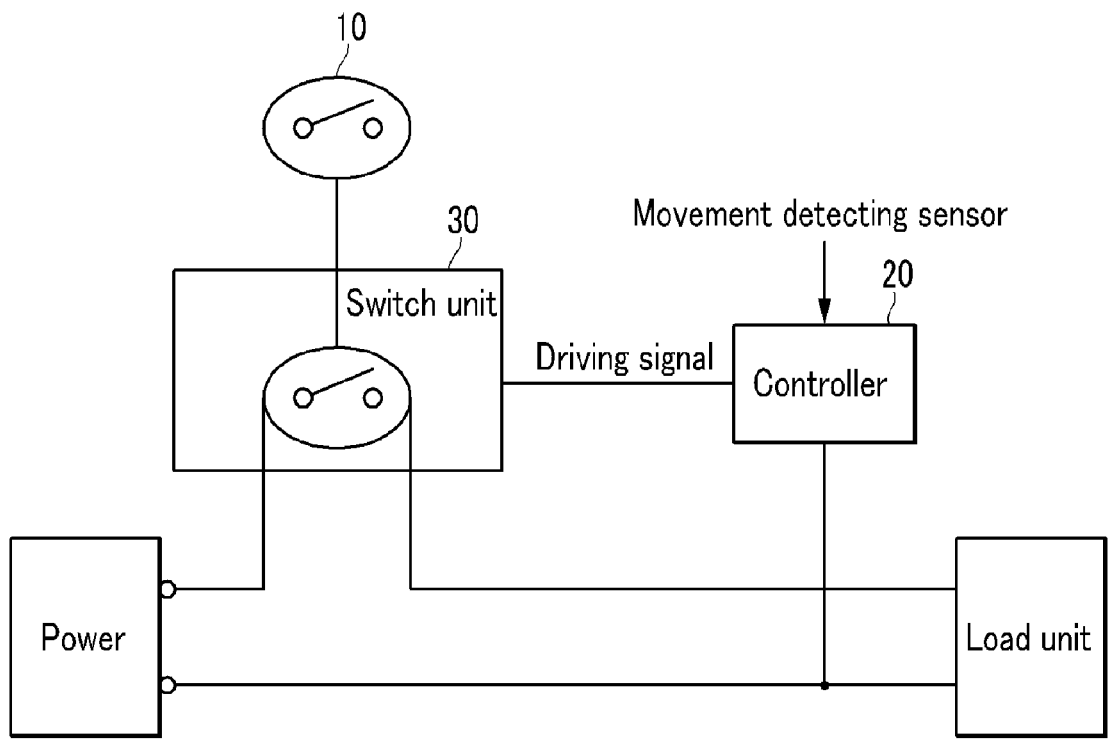
FIG. 6 shows a connection of constituent elements for preventing standby power consumption in the half-automatic switch according to the second exemplary embodiment of the present invention.

FIG. 6 shows a connection of constituent elements for preventing standby power consumption in the half-automatic switch according to the second exemplary embodiment of the present invention.

Referring to FIG. 6, in the half-automatic switch according to the second exemplary embodiment of the present invention, a terminal of the switch unit 30 is connected to a source of electrical power, and another terminal of the switch unit 30 is connected to the controller 20. A terminal of the controller 20 is connected to the source. A terminal of the load unit 3 is connected to the switch unit 30, and another terminal of the load unit 3 is connected to the source.

With these connections, when the input switch 10 operates, the switch unit 30 operates, then power is supplied to the controller 20 through the switch unit 30, and also power is supplied to the load unit 3 through the switch unit 30.

Therefore, the controller 20 determines whether a target object exists based on the signal from the movement detecting sensor 2, and stops the operation of the switch unit 30 when it is determined that the target object does not exist.

Meanwhile, when the operation of the switch unit 30 is stopped by the input switch 10 or the controller 20, the power supplied to the load unit 3 and the controller 20 is cut.

As described above, power is supplied to the controller 20 only when the switch unit is operated, which stops standby power for driving the controller 20 from being consumed and efficiently saves power.

Depending on the purpose, these connections are selectively embodied. The controller 20 may automatically cause the switch unit 30 to be turned off when standby power is always supplied to operate the controller 20. Particularly, when the switch unit of the half-automatic switch is off, the off-state is maintained irrespective of the signal from the movement detecting sensor 2, thereby it is possible to prevent power from being unnecessary consumed by malfunction of the movement detecting sensor 2.

Next, a half-automatic switch according to a third exemplary embodiment of the present invention will be described.

Figure 7:
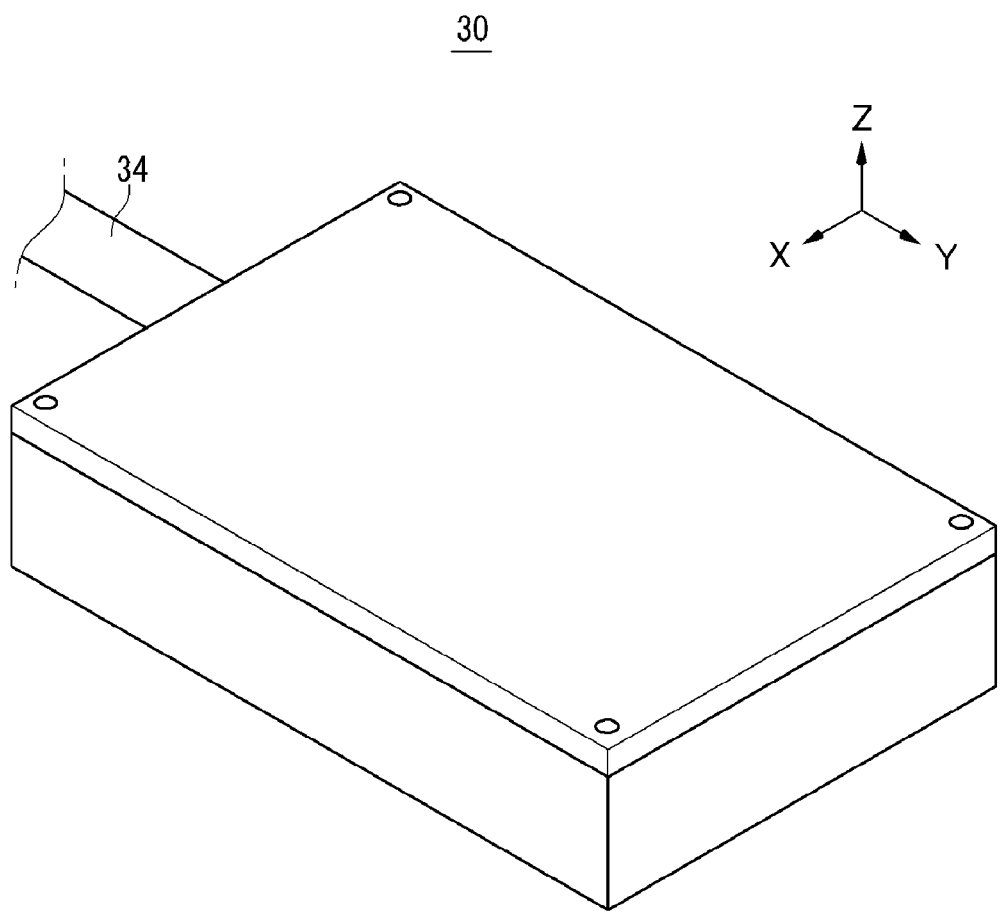
FIG. 7 shows a perspective view of a switching unit according to a third exemplary embodiment of the present invention.
Figure 8:
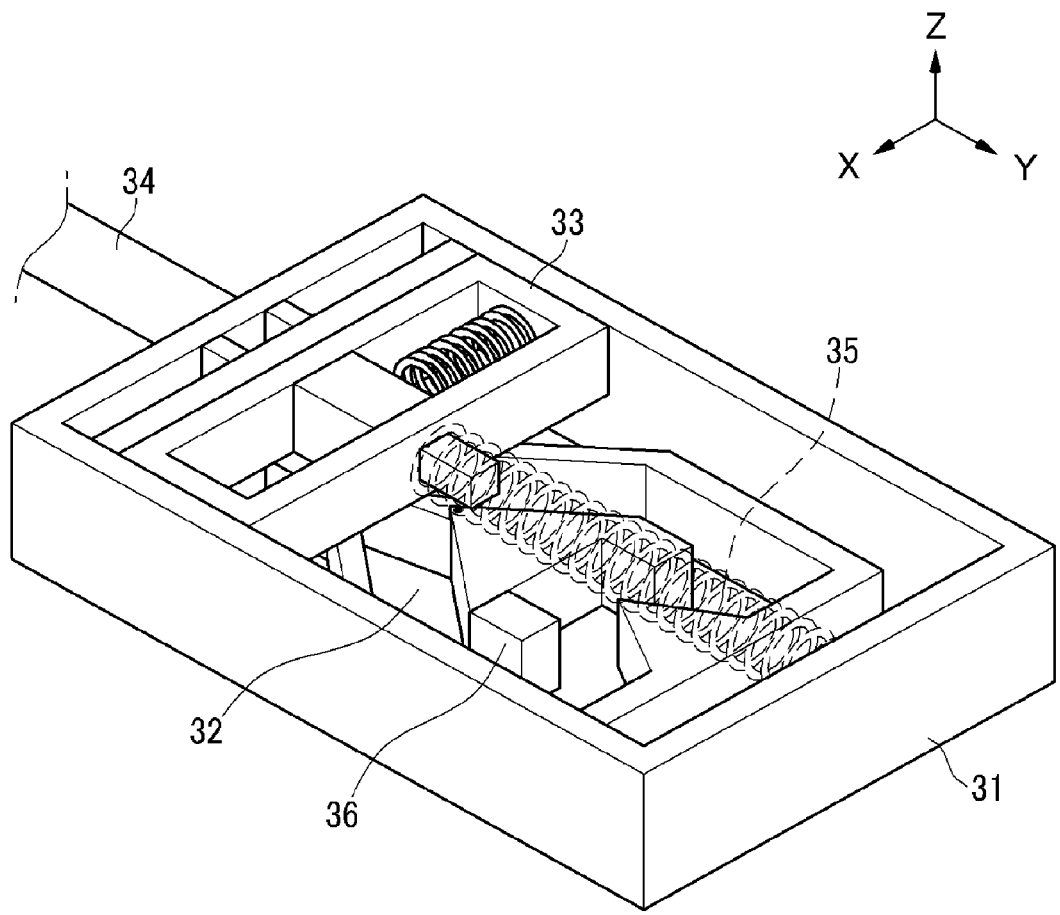
FIG. 8 shows an exploded perspective view of the switching unit in FIG. 7.

FIG. 7 shows a perspective view of the exterior of the half-automatic switch according to the third exemplary embodiment of the present invention, and FIG. 8 shows a exploded perspective view of the half-automatic switch in FIG. 7.

The half-automatic switch according to the third exemplary embodiment of the present invention, as in the first and second exemplary embodiments, includes a controller 20 and a switch unit 30.

The switch unit 30 is constituted to be automatically or manually turned off. An input switch 10 may be selectively included as necessary in the half-automatic switch according to the third exemplary embodiment of the present invention.

In a case where the input switch 10 is included, the switch unit 30 is constituted to be turned on/off in while concert with the operation of the input switch 10.

Herein, for better comprehension and ease of description, the same references as for the first exemplary embodiment are allocated to the controller and the switch unit.

As shown in FIG. 7 and FIG. 8, the switch unit 30 includes a guide unit 32 that is formed in a case 31, a moving unit 33 that moves along the guide unit 32, a pressure unit 34 that presses the moving unit 33, and an elastic unit 35 that supplies elastic force in the direction opposite to the direction in which the pressure is applied to the moving unit 33, and further includes a magnetic switch 36 that controls the moving of the moving unit 33 in concert with the guide unit 32 and is operated according to a signal from the controller 20.

Herein, the pressure unit 34 functions as an operation button for driving the switch unit 30, and the input switch 10 may be turned on/off in concert with the operation of the pressure unit 34 when the input switch 10 is included in the half-automatic switch 1.

A power supply route is formed or blocked based on the moving state of the moving unit 33.

The moving unit 33 moves by the pressure unit 34 from an initial position in which the power supply route is blocked in the direction of a Y axis, and the elastic unit 35 is contracted by the moving of the moving unit 33, thereby applying elastic force for returning the moving unit 33 to the initial position in the direction of the −Y axis. The moving unit 33 moves by the pressure unit 34 until arriving at a driving position in which the power supply route is formed.

After this, the moving unit 33 moves along the guide unit 32 by pressure applied by the pressure unit 34 and elastic force applied by the elastic unit 35, or returns to the initial position from the driving position by the magnetic switch 36 that is driven by the controller 20. When the moving unit 33 is out of the driving position, the power supply route is blocked.

Figure 9:
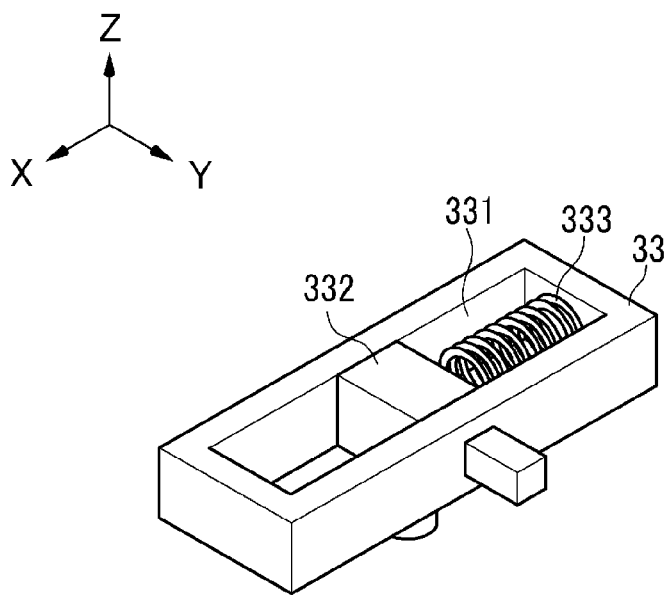
FIG. 9 shows a perspective view of a moving unit in FIG. 8.
Figure 10:
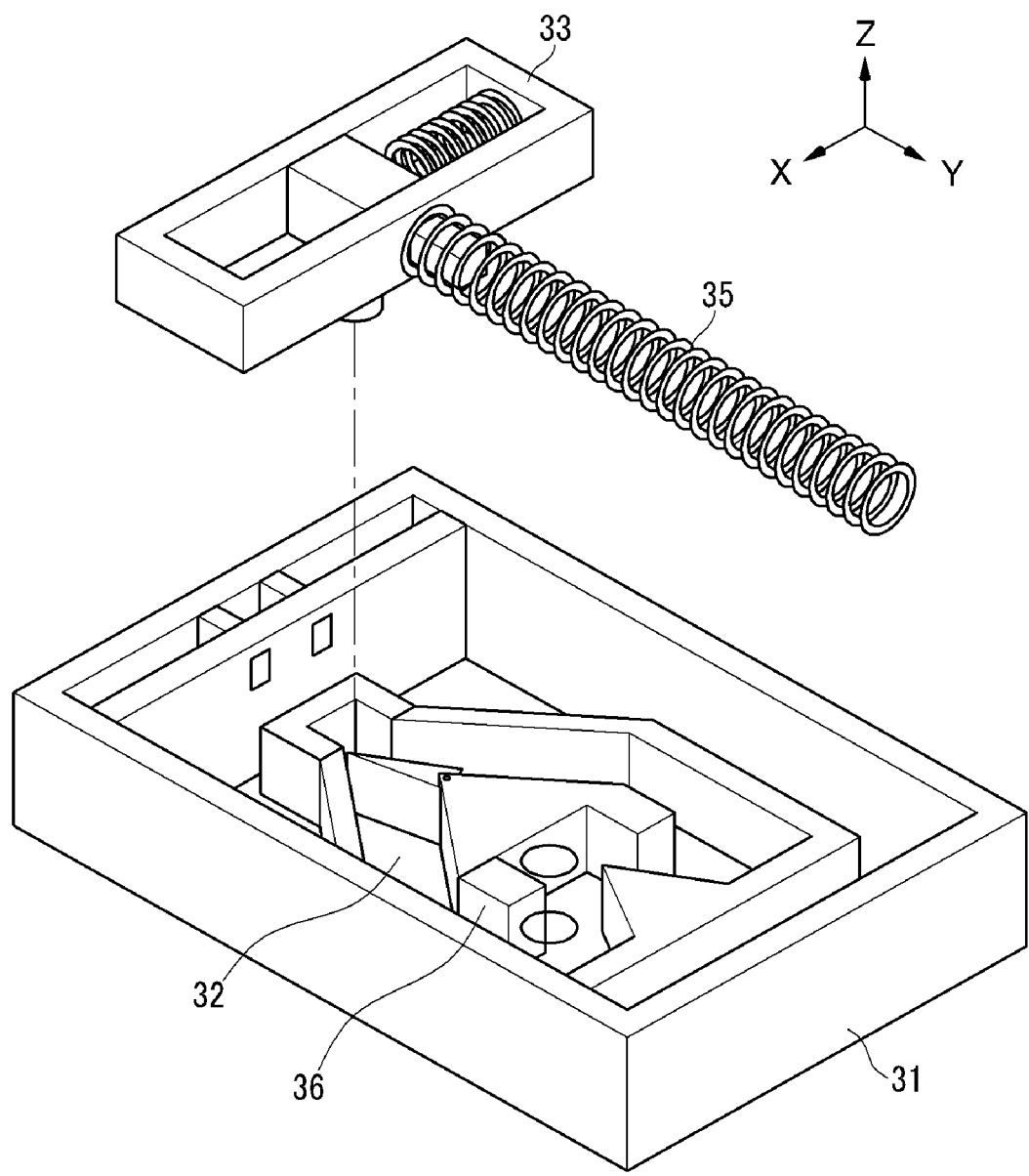
FIG. 10 shows an exploded perspective view in which the moving unit in FIG. 8 is connected to a case.

FIG. 9 shows a perspective view of the moving unit 33 according to the exemplary embodiment of the present invention, and FIG. 10 shows an exploded perspective view in which the moving unit 33 is joined to the case 31.

As shown in FIG. 9 and FIG. 10, the moving unit 33 according to the exemplary embodiment of the present invention includes a guide groove 331, a guide protrusion 332 that is movable along the guide groove 331, and an elastic member 333 that applies elastic force to the guide protrusion 332.

The guide protrusion 332 is formed to move along the guide groove 331 and is located at a position when joining with the guide unit 32. At this time, elastic force by the elastic member 333 is continuously applied to the guide protrusion 332 in the direction of the X axis in FIG. 9.

Figure 11:
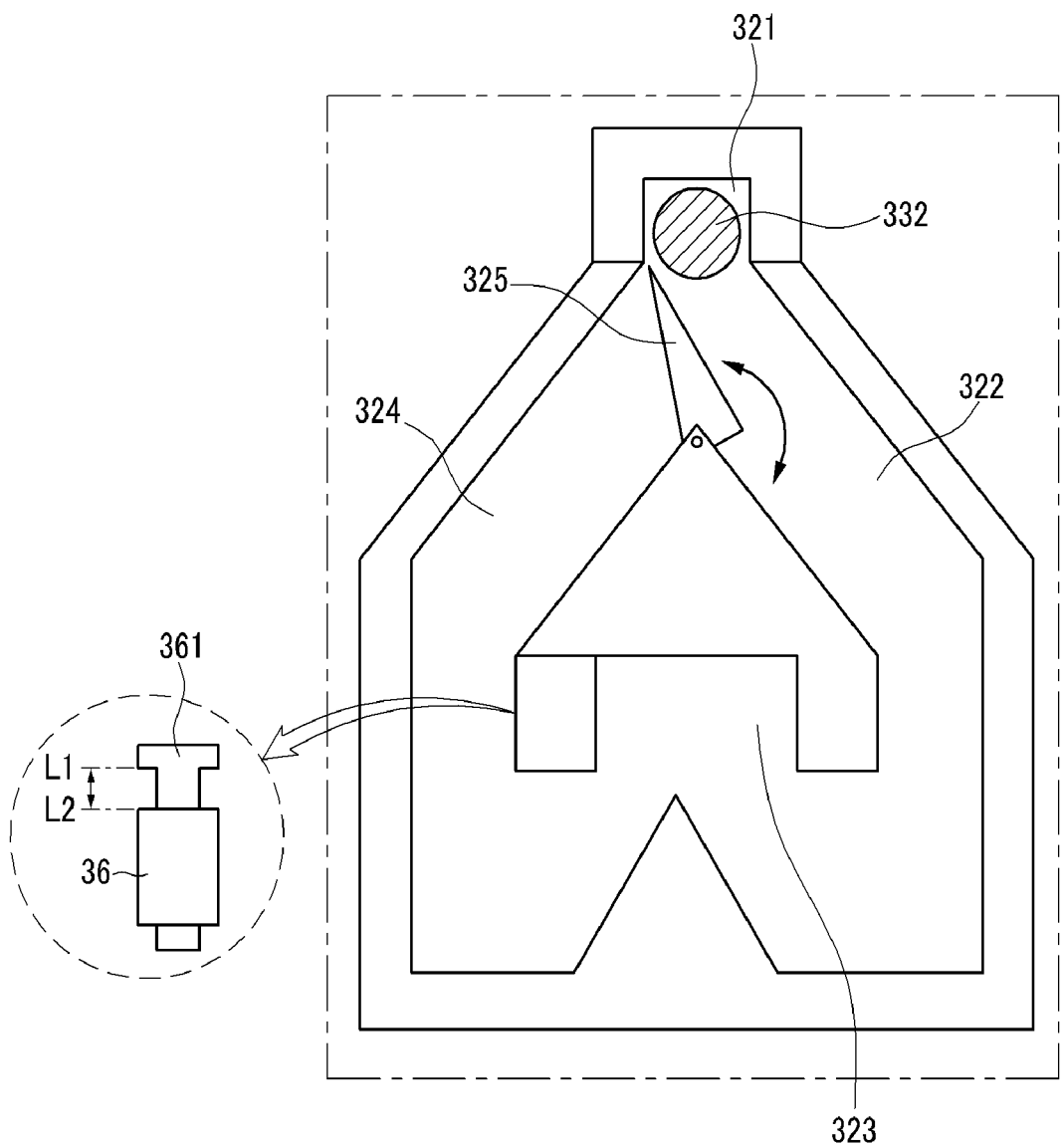
FIG. 11 shows a top plan view of a guide unit in FIG. 8.

FIG. 11 shows a top plan view of the guide unit according to the exemplary embodiment of the present invention.

As shown in FIG. 11, the guide unit 32 includes an initial stopping unit 321 that causes the moving unit 33 to be stopped at the initial position, a first guide unit 322 that moves the moving unit 33 from the initial position to the driving position, a middle stopping unit 323 that stops the moving unit 33 at the driving position, a second guide unit 324 that moves the moving unit 33 from the driving position to the initial position, and a hinge member 325 that guides the moving unit 33 to be located at the initial position and is formed to be rotatable.

The guide protrusion 332 of the moving unit 33 is located at the initial position of the guide unit 32, a part of the magnetic switch 36 is formed to be connected in the middle stopping unit 323, and the guide protrusion 332 of the moving unit 33 is stopped by the middle stopping unit 323 and is then located thereto.

More specifically, the magnetic switch 36, as shown in an enlarged part of FIG. 11, includes a protruding unit 361 that is movable in the arrow direction of FIG. 11 according to a signal from the controller 20.

When the protruding unit 361 is initially located at a first position L1, the moving unit 33 is stopped and located at the middle stopping position 323 while being supported by the protruding unit 361, but the moving unit 33 moves out of the middle stopping unit 323 when the protruding unit 361 moves to a second position L2. For this, more specific description will be provided later.

Next, the operation of the switch unit 30 according to the third exemplary embodiment of the present invention will be described.

Figure 12:
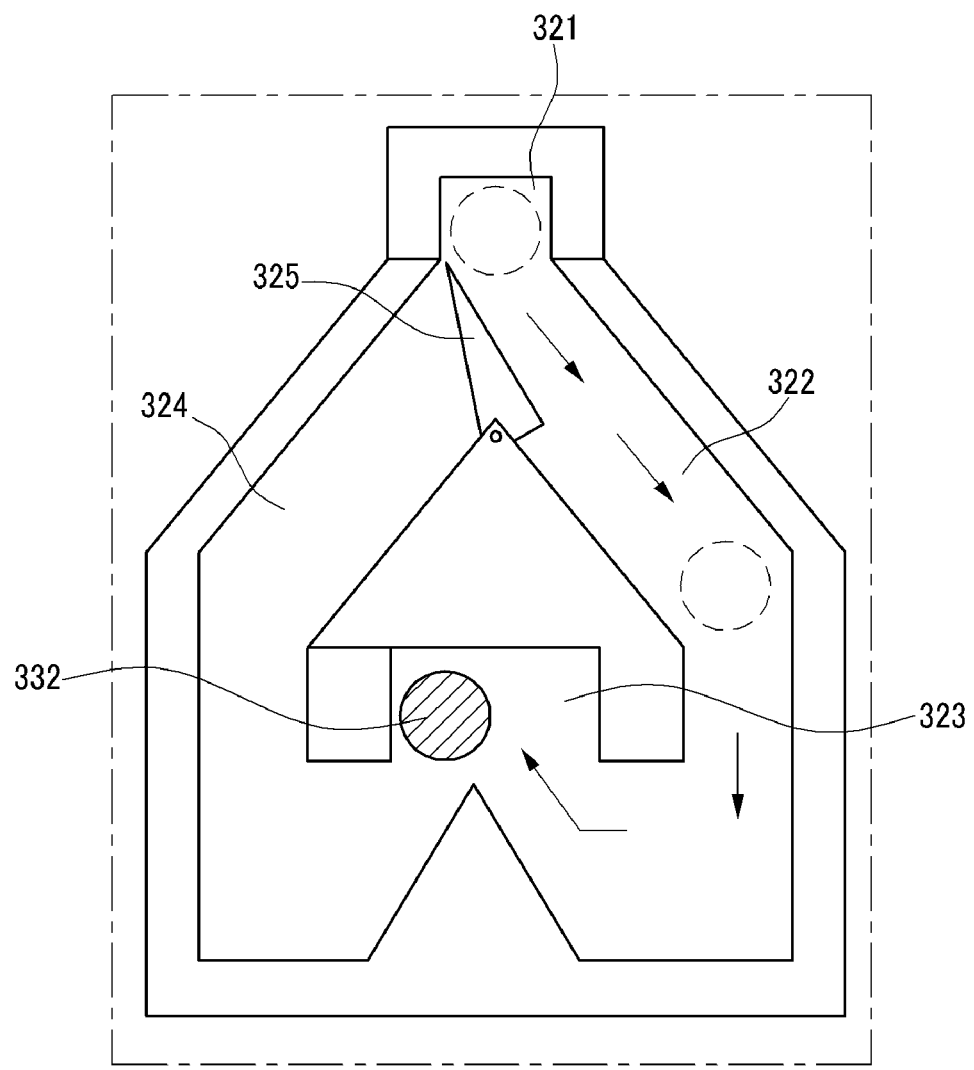
FIG. 12 and FIG. 13 show an operation state of a switching unit according to a third exemplary embodiment of the present invention.
Figure 13:
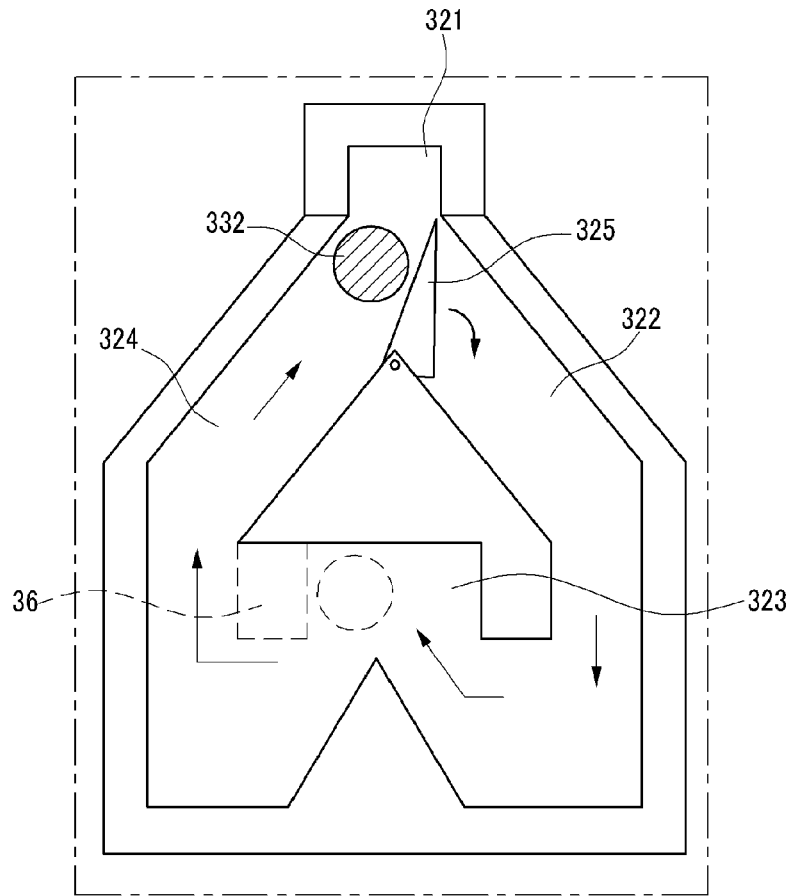

FIG. 12 and FIG. 13 show the operation state of the switch unit.

When the half-automatic switch according to the third exemplary embodiment of the present invention is off, that is, as shown in FIG. 11, when the moving unit 33 of the switch unit 30 is located at the initial position by the initial stopping unit 321, the power supply route is blocked, thereby causing the load unit 3 to not be driven.

When a user presses the pressure unit 34 of the switch unit 30 that operates with the input switch 10 in order to turn the half-automatic switch on, as shown in FIG. 12, the guide protrusion 332 of the moving unit 33 moves out of the middle stopping unit 321 and then moves along the first guide unit 322.

The moving unit 33 moves along the first guide unit 322 by pressure that is applied in a +Y axis direction (a first direction) by the pressure unit 3, elastic force that is applied in a −Y axis direction (a second direction) by the elastic unit 35, and elastic force that is applied in a +X axis direction (a third direction) by the elastic member 333, and is then stopped by the middle stopping unit 323. At this time, since the protruding unit 361 of the magnetic switch 36 is located at the first position L1, the guide protrusion 332 of the moving unit 33 maintains the stopped state in which it is stopped by the middle stopping unit 323.

When the moving unit 33 is stopped, the power supply route is formed to supply power and then the load unit 3 is driven. In this case, as in the first and second exemplary embodiments, the controller determines whether a detection signal from the movement detecting sensor 2 is provided.

When the detection signal is not provided, the controller 20 drives the timer and stops the driving of the switch unit 30 when the time counted by the timer passes a predetermined time. That is, the controller 20 outputs a driving stopping signal to the switch unit 30, and then the protruding unit 361 of the magnetic switch 36 of the switch unit 30 moves to the second position L2 according to the driving stopping signal.

In this case, by using an iteration number as a control parameter in addition to comparing the counted time with the predetermined time, as in the first and the second exemplary embodiments, when the iteration number representing how many times the count time passes the predetermined time is greater than a predetermined number, the controller 20 may stop the driving of the switch unit 30.

By stopping the driving of the switch unit 30, as shown in FIG. 13, the guide protrusion 332 of the moving unit 30 that has been stopped at the driving position corresponding to the middle stopping unit 323 by the protruding unit 361 of the magnetic switch 36 moves along the second guide unit 324.

When the moving unit 33 moves out of the driving position, the power supply route is blocked and the driving of the load unit 3 is stopped. The moving unit of the switch unit 30 returns the initial position by moving along the second guide unit 324.

At this time, the hinge member 325 rotates in the arrow direction by the guide protrusion 332 of the moving unit 33, and then rotates in the opposite arrow direction to support the guide protrusion 332 of the moving unit 33 being located at the initial stopping unit 321 when the guide protrusion 332 is located at the initial position.

As in the described processes, the switch unit 30 may be automatically turned off when it has been manually turned on.

Meanwhile, in the case in which the moving unit 30 is stopped at the driving position by the middle stopping unit 323, if a user again manually presses the pressure unit 34, the guide protrusion 332 of the moving unit 30 moves out of the middle stopping unit 323 by pressure applied to the pressure unit 34 and elastic force from the elastic member 333, which causes the protruding unit 361 of the magnetic switch 36 to move from the first position L1 along the second guide unit 324 and then returns to the initial position.

In this case, when the guide protrusion 332 from the middle stopping unit 323 moves to the second guide unit 324, the friction between the guide protrusion 332 and the magnetic switch 36 functions as the maximum resisting power, while the friction may be reduced by making them of a material with a low friction coefficient. Accordingly, it is possible to control driving power of the magnetic switch 36 to be low.

Through the described processes, the switch unit 30 may be manually turned off, irrespective of the control of the controller 20, when the switch unit 30 has been manually turned on.

By the third exemplary embodiment, the same effects as in the first and second exemplary embodiments may be provided.

In addition, the switch unit 30 according to the third exemplary embodiment may be applied to the first and second exemplary embodiments.

Meanwhile, in the first to third exemplary embodiments, the half-automatic switch 1 may further include a sensor controller that selectively controls a signal from the movement detecting sensor 2 according to the control of the controller 20, so that the controller 20 efficiently determines whether there is a target object in the area, in concert with the movement detecting sensor 2.

Next, a half-automatic switch according to the fourth exemplary embodiment of the present invention, in concert with the sensor controller, will be described.

Figure 14:
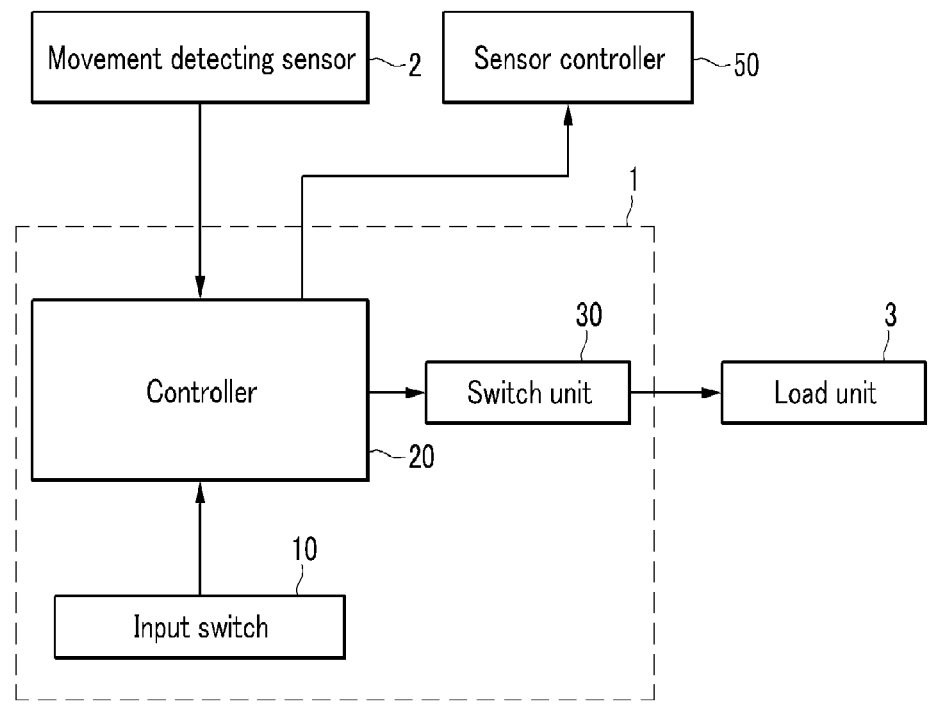
FIG. 14 shows a configuration diagram of a half-automatic switch according to a fourth exemplary embodiment of the present invention.

FIG. 14 shows a configuration diagram of the half-automatic switch according to the fourth exemplary embodiment of the present invention.

As shown in FIG. 14, the half-automatic switch according to the fourth exemplary embodiment of the present invention, like the above exemplary embodiments, includes an input switch 10, a controller 20, and a switch unit 30, and further includes a sensor controller 50 for controlling a signal from a target object to be input to the movement detecting sensor 2 based on the control of the controller 20.

Herein, for example, the sensor controller 50 is applied to the half-automatic switch having the configuration of the first exemplary embodiment in which the controller 20 drives the switch unit 30 according to the operation state of the input switch 10, but the fourth exemplary embodiment of the present invention is not restricted thereto. That is, the sensor controller 50 may be applied to the second and third exemplary embodiments as follows.

Since the half-automatic switch according to the fourth exemplary embodiment of the present invention may operate like the first to third exemplary embodiments, it will be described while focusing on the operation of the sensor controller 50.

When the movement detecting sensor 2 detects whether there is a target object in an area, it may determine there is no target in the area even though the target is there.

This is due to the characteristics of the movement detecting sensor 2. More specifically, the movement detecting sensor 2 determines there is a target object when detecting light from the target object, for example, when a detected amount of infrared light is changed. Accordingly, when there is no change in the detected amount of infrared light because the target object does not move, the movement detecting sensor 2 may erroneously determine that there is no target object.

In the fourth exemplary embodiment of the present invention, in order to prevent the movement detecting sensor from misjudging, the sensor controller 50 is established in the input side of the movement detecting sensor 2 to be rotatable or to be opened/closed, and the controller 20, as in the first to third exemplary embodiments, operates when a condition is satisfied, determines whether a target object exists according to a signal from the movement detecting sensor 2, and then outputs a control signal to the sensor controller 50 by a predetermined time.

Therefore, the sensor controller 50 performs an operation of opening/closing, an operation of rotation, or an operation of shaking by the predetermined time, which causes the amount of light input to the movement detecting sensor 2 through the sensor controller 50 to be changed.

As a result, the amount of light detected by the movement detecting sensor 2 is changed even though the target object stops or scarcely moves. Therefore, the movement detecting sensor 2 detects the changed amount of light, directly determines whether the target object exists, or outputs a signal corresponding to the detected amount of light to the controller 20 so that the controller 20 determines whether the target object exists.

Accordingly, in the fourth exemplary embodiment of the present invention, it is possible to correctly determine whether the target object exists when the half-automatic switch is driven, thereby preventing the driving of the half-automatic switch to stop even when the target object exists.

Meanwhile, in all the exemplary embodiments of the present invention, the controller 20 may operate in concert with one or more movement detecting sensors and control them.

Also, when there are more than two movement detecting sensors, sensor controllers may be installed corresponding to each sensor and may be controlled by the controller as described above.

Particularly, the movement detecting sensors may be classified into groups. At this time, when the movement detecting sensors of each group are satisfied with the above driving condition, load units (e.g., light) that are respectively installed in each area corresponding to the groups may be simultaneously driven.

For example, in an office or a lecture room, dozens of lights hanging from the ceiling are classified into groups, a movement detecting sensor corresponding to each group is suitably located, and a half-automatic switch corresponding to each sensor is used as a wall switch. In this case, it is possible to make each half-automatic switch turn on/off as a user pleases even though there is a person in an area corresponding to each group, thereby free using lighting in a corresponding area. Herein, an additional electric device that cuts power supplied to the office or the lecture room to cause all electric appliances there to be turned off when there is no signal from any movement detecting sensor may be installed.

Further, a new electric appliance may be produced in a form in which a movement detecting sensor or an input switch as a part of the half-automatic switch according to the exemplary embodiments is built therein or is attached thereto.

In addition, when applying the half-automatic switch according to the exemplary embodiments to existing electric appliance, it may be embodied in a form of a multi-outlet power strip. Herein, the multi-outlet power strip functions as a load unit of the half-automatic switch. It is possible to supply power to existing electric appliances plugged into the multi-outlet power strip as in the described exemplary embodiment. A plug of the multi-outlet power strip may be embodied in a form of a general switch for an electric appliance that should be always turned on.

Also, the input switch of the half-automatic switch according to the exemplary embodiments may be driven by remote control. Since a person of ordinary skill in the art may embody this based on the exemplary embodiments, a detailed description will be omitted.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A half-automatic switch that is connected to a movement detecting sensor and supplies power to a load unit using electrical energy, the switch comprising:
   a switch unit for supplying power the load unit when being driven; and
   a controller that stops the driving of the switch unit to cut the power supplied to the load unit when a detection signal from the movement detecting sensor is provided in a state in which the switch unit is driven,
   wherein the controller maintains stopping the driving of the switch unit, irrespective of the detection signal from the movement detecting sensor, when the switch unit is not driven;
   wherein the switch unit includes:
      a guide unit;
      a moving unit that moves along the guide unit to form or block a power supply route of power supplied to the load unit;
      a pressure unit that presses the moving unit by force input from outside;
      an elastic member that applies elastic force to the moving unit in the direction opposed to the direction in which the pressure of the pressure unit is applied to the moving unit; and
      a magnetic switch that controls the moving of the moving unit and is operated according to a signal from the controller,
      wherein the moving unit moves along the guide unit by the pressure applied by the pressure unit and the elastic force applied by the elastic member.

2. The half-automatic switch of claim 1, wherein the switch unit is manually driven, and the driving of the switch unit is manually stopped or is stopped by the control of the controller.

3. The half-automatic switch of claim 1, further including an input switch for driving the switch unit,
   wherein the switch unit drives when the input switch operates, and the driving of the switch unit stops when the operation of the input switch stops or the input switch re-operates.

4. The half-automatic switch of claim 1, wherein the controller operates by power that is supplied when the switch unit is driven.

5. The half-automatic switch of claim 1 wherein
   the moving unit moves along the guide unit from an initial position in which the power supply route is blocked to a driving position in which the power supply route is formed, and then moves along the guide unit from the driving position to the initial position.

6. The half-automatic switch of claim 5, wherein
   the moving unit returns from the driving position to the initial position by the operation of the magnetic switch.

7. The half-automatic switch of claim 6, wherein
   the guide unit includes:
      an initial stopping unit that locates the moving unit at the initial position;
      a first guide unit that moves the moving unit from the initial position to the driving position;
      a middle stopping unit that locates the moving unit at the driving position;
      a second guide unit that moves the moving unit from the driving position to the initial position; and
      a hinge member that guides the moving unit to be located at the initial position and is rotatable.

8. The half-automatic switch of claim 7, wherein the moving unit includes:
   a guide groove;
   a guide protrusion that is formed to be movable along the guide groove; and
   an elastic member that applies elastic force to the guide unit so the guide protrusion is located at the guide groove and then moves along the guide unit.

9. The half-automatic switch of claim 1 wherein
   the controller counts a time when a detection signal from the movement detecting sensor is not provided in a case in which the switch unit is driven, and stops the driving of the switch unit when the detection signal is not provided even though the counted time passes a predetermined time.

10. The half-automatic switch of claim 9, wherein
    the controller stops the driving of the switch unit when an iteration number representing how many times the counted time has passed the predetermined time is greater than a predetermined number.

11. The half-automatic switch of claim 1, further including a sensor controller that is installed in the input side of the movement detecting sensor and operates according to a signal from the controller to change the extent that a signal is inputted to the movement detecting sensor.

12. The half-automatic switch of claim 11, wherein
    the controller causes the sensor controller to perform an operation of opening/closing, an operation of rotation, or an operation of shaking by a predetermined time when the switch unit is driven.

13. The half-automatic switch of claim 1, wherein
    the controller counts a time when a detection signal from the movement detecting sensor is not provided in a case in which the switch unit is driven, and stops the driving of the switch unit when the detection signal is not provided even though the counted time passes a predetermined time.

14. The half-automatic switch of claim 1, further including a sensor controller that is installed in the input side of the movement detecting sensor and operates according to a signal from the controller to change the extent that a signal is inputted to the movement detecting sensor.

* * * * *